United States Patent
Mack et al.

(10) Patent No.: US 7,993,226 B2
(45) Date of Patent: Aug. 9, 2011

(54) CLAMPING DRIVE WITH MECHANICAL DAMPING FOR A TRACTION MECHANISM DRIVE

(75) Inventors: Stefan Mack, Erlangen (DE); Bernd Hartmann, Weisendorf (DE); Thomas Mennerat, Nuremberg (DE); Jorg Kaiser, Lonnerstadt (DE); Manfred Wilhelm, West Bloomfield, MI (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 1076 days.

(21) Appl. No.: 11/575,880

(22) PCT Filed: Aug. 11, 2005

(86) PCT No.: PCT/EP2005/008712
§ 371 (c)(1),
(2), (4) Date: Jun. 28, 2007

(87) PCT Pub. No.: WO2006/032328
PCT Pub. Date: Mar. 30, 2006

(65) Prior Publication Data
US 2009/0321211 A1  Dec. 31, 2009

(30) Foreign Application Priority Data
Sep. 23, 2004 (DE) .......... 10 2004 046 092

(51) Int. Cl.
*F16H 7/12* (2006.01)

(52) U.S. Cl. ......... 474/135; 474/133; 474/117; 474/101

(58) Field of Classification Search ................. 474/135, 474/94, 112, 133, 109, 136, 138, 101, 114, 474/115, 116, 117
See application file for complete search history.

(56) References Cited

U.S. PATENT DOCUMENTS

| 5,449,328 A * | 9/1995 | Schmidt et al. ............... 474/135 |
| 6,468,172 B1 * | 10/2002 | Lang et al. .................... 474/135 |
| 6,857,977 B1 * | 2/2005 | Bertelshofer et al. ......... 474/117 |
| 7,384,355 B2 * | 6/2008 | Ayukawa et al. ............. 474/135 |
| 7,588,507 B2 * | 9/2009 | Ayukawa et al. ............. 474/135 |
| 2002/0177499 A1 * | 11/2002 | Ayukawa et al. ............. 474/135 |
| 2008/0125260 A1 * | 5/2008 | Wilhelm et al. ............... 474/135 |
| 2010/0048336 A1 * | 2/2010 | Mack et al. .................... 474/138 |

FOREIGN PATENT DOCUMENTS

| DE | 2055678 | 3/1972 |
| DE | 4343429 | 8/1999 |
| DE | 10248352 | 4/2004 |

* cited by examiner

*Primary Examiner* — Emmanuel M Marcelo
(74) *Attorney, Agent, or Firm* — Volpe and Koenig, P.C.

(57) ABSTRACT

A clamping device with mechanical damping for a traction mechanism drive is provided. The device includes a clamping arm which carries a tension roller on one end thereof and is rotatably mounted in a housing at the other end thereof via a shaft connected thereto in a rotationally fixed manner, and is elastically supported on the housing by a torsion spring. A free end of the shaft is connected to a friction disk in a rotationally fixed manner, and a friction lining is arranged between the friction disk and an axial abutment surface of the housing. The invention reduces the friction lining wear and increases the damping capacity thereof. To accomplish this, a separate friction disk (7'''') is connected to a separate friction lining (8'''') in a positively locked manner without play, and the separate friction lining ((8'''')) is in frictional contact with the axial abutment surface (10) of the housing (1).

10 Claims, 7 Drawing Sheets

CLAMPING DRIVE WITH MECHANICAL DAMPING FOR A TRACTION MECHANISM DRIVE

FIELD OF THE INVENTION

The invention relates to a clamping device with mechanical damping for a traction mechanism drive.

BACKGROUND OF THE INVENTION

In DE 43 43 429 C2, a clamping device with mechanical damping is disclosed, which is provided for a traction mechanism drive, with the device comprising a clamping arm, which carries a tension roller on one end, which is rotatably mounted in a housing via a shaft connected in a rotationally fixed manner on its other end, and which is elastically supported on the housing by means of a torsion and compression spring, wherein the free end of the shaft is connected in a rotationally fixed manner to a friction disk and a friction lining is arranged between the friction disk and an axial abutment surface of the housing. The abutment surface of the housing has a plurality of sharp-edged projections, which extend in the axial direction and which dig into the friction lining. Therefore, the friction lining is connected rigidly to the abutment surface of the housing, while the damping motion takes place between the friction lining and the friction disk. This solution requires a relatively soft friction lining, which is less stable. In addition, strong heating occurs on the friction lining, because the steel friction disk dissipates the friction heat only poorly. The high temperatures also cause increased wear on the friction lining and reduced damping capacity.

OBJECT OF THE INVENTION

Therefore, the invention is based on the objective of creating a clamping device with mechanical damping for traction mechanism drives, which is distinguished through low wear on the friction lining and high damping capacity.

SUMMARY OF THE INVENTION

The objective is met according to the invention.

The play-free positive locking between the separate friction disk and the separate friction lining prevents frictional movement between these parts and ensures that frictional movement is possible only between the friction surface of the separate friction lining and the axial contact surface of the housing.

This housing, which is comprised of light metal, has a large heat storage capacity, good thermal conduction, and a large cooling surface area. This has a favorable effect on the temperature of the friction surface of the separate friction lining and thus on its friction capacity and service life. Through the play-free positive locking between the separate friction disk and the separate friction lining, a change in contact of the separate friction lining between the separate friction disk and the axial abutment surface of the housing is reliably prevented and the associated noise is avoided.

It is advantageous that the positive locking is realized by mating contact surfaces of the separate friction disks and separate friction linings, wherein the contact surfaces are arranged within the entire peripheral area of the separate friction disks and separate friction linings. The position and size of the contact surfaces in the entire peripheral area of the separate friction disk and the separate friction lining minimizes the forces appearing on the contact surfaces and thus minimizes their deformation and wear.

The overlapping of the mating contact surfaces deforms the contact surfaces of the separate friction lining when the softer separate friction lining is pressed into the harder separate friction disk. In this way, freedom of play between the contact surfaces and axial fixing of the separate friction lining with the separate friction disk are achieved. The freedom of play for the positive locking is an important prerequisite for preventing wear and reducing noise.

The rotationally symmetric shape of the contact surfaces creates equal loading in both rotational directions of the separate friction disks.

A separate friction disk, which has a flat countersunk region with a circular basic shape for a separate friction lining that has four semi-elliptical recesses distributed preferably uniformly on its periphery with contact surfaces engaging with contact surfaces of corresponding raised sections of the separate friction disk, is used as a first variant of the separate friction disks and linings according to the invention.

Through the peripheral position of the contact surfaces of the semi-elliptical recesses and raised sections of the separate friction lining and the separate friction disk, respectively, their loading and thus their deformation and wear are minimized.

The same also applies when the contact surface of the separate friction disk and the contact surface of the mating separate friction lining have a polygonal or multiple-corner shape.

The overlapping necessary for the freedom of play between the semi-elliptical or the polygonal contact surfaces is implemented through deformable mini teeth fixed to the contact surfaces of the separate friction linings.

The mini teeth, which are connected integrally to the contact surfaces and which are arranged radially, are deformed when the separate friction linings are pressed into the countersunk region of the separate friction disks between the contact surfaces and thus bridge the play created between these parts. Through the play-free positive locking, the friction moment can be transmitted without play in both rotational directions.

It is advantageous that the contact surface of a flat countersunk region of the separate friction disk and the contact of the mating separate friction lining preferably have a dodecagonal shape. This has proven to be the best compromise in terms of loading and surface area of the separate friction lining for the polygon shapes.

An advantageous refinement of the invention is provided in that the separate friction disk and the separate friction lining have identical spur gearing, whose tooth flanks are used as contact surfaces. Due to the spur gear geometry, the separate friction lining centers itself on the separate friction disk and is therefore very easy to assemble. The friction moment is also transferred here without play in both rotational directions.

An advantageous construction of the invention is provided in that axial teeth are arranged on the periphery of the separate friction disk and the separate friction lining and radial teeth are arranged on the periphery of another separate friction disk and another separate friction lining, with the teeth being constructed as teeth couplings and their tooth flanks being used as contact surfaces.

For these variants, it also applies that the transmission of the friction moment at the periphery of the separate friction disks or the separate friction linings leads to minimized forces. The overlap of the contact surfaces here also produces a press fit between the separate friction disks and the separate friction linings, which is used for play-free transmission of the friction moment in both rotational directions and for axial fixing of the separate friction linings on the separate friction disks.

The installation of a damping element that is possible with the exception of the spur-gear variants between the separate friction disk and separate friction lining reduces the noise transfer in this region.

BRIEF DESCRIPTION OF THE DRAWINGS

Additional features of the invention emerge from the following description and drawings, in which embodiments of the invention are shown schematically.

Shown are.

DETAILED DESCRIPTION OF THE DRAWINGS

Figure 1:
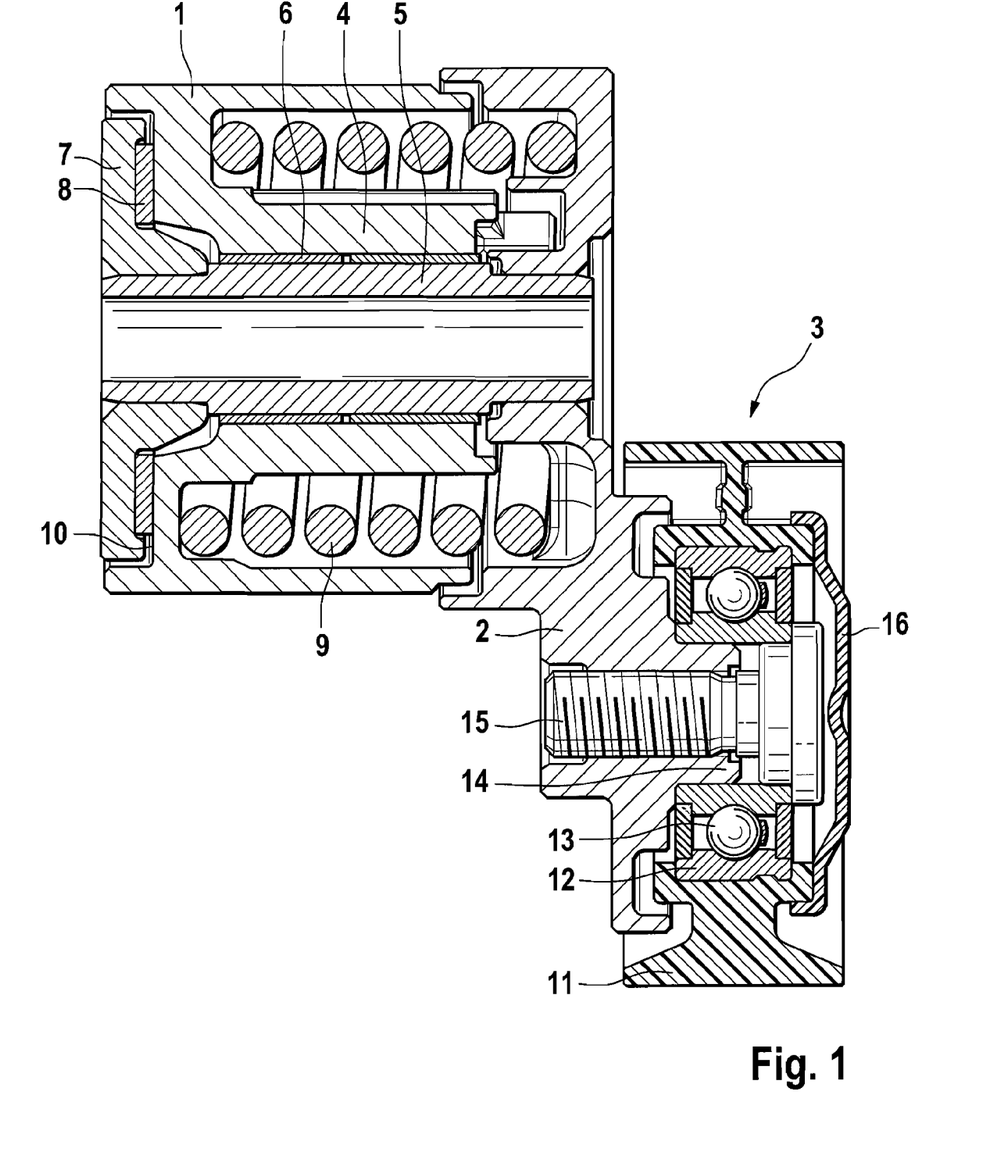
FIG. 1 a longitudinal section view through a mechanically damped clamping device.

In FIG. 1, a longitudinal section through a clamping device for a traction mechanism drive is shown, which has mechanical damping.

The clamping device is comprised essentially of a housing 1, a clamping arm 2, and a tension roller 3. The housing 1 is bucket shaped and connected integrally to a concentric hub 4 in its interior. In the hub 4, a shaft 5 connected in a rotationally fixed manner to the clamping arm 2 via a press fit is supported rotatably in a sliding bearing 6.

The shaft 5 is connected in a rotationally fixed manner, likewise through a press fit, to a friction disk 7, which connects to a friction lining 8 in a positively locking manner.

The clamping arm 2 is biased in the direction of a not-shown traction mechanism, e.g., a belt or a chain, by a helical spring 9 acting as a torsion spring. The helical spring 9 is located in an interior of the bucket-shaped housing 1 and is fixed with one winding end on the clamping arm 2 and on the housing 1.

The helical spring 9 exerts a pressure force on the housing 1 and the clamping arm 2, which is transmitted via the shaft 5 to the friction disk 7 and acts on an abutment surface 10 of the housing 1 as the contact pressure force of the friction lining 8.

The tension roller 3 is constructed as a plastic part 11 and is fixed to an outer ring 12 of a roller bearing 13. This is centered on a collar 14 of the clamping arm 2 and connected to this collar by a screw 15. The roller bearing 13 is sealed on both sides and is covered by a protective cap 16, which locks into the tension roller 3.

The variants of the friction disk 7 or the friction lining 8 according to the invention are shown as separate friction disks 7' to 7''''' and as separate friction linings 8' to 8''''' in FIGS. 2 to 7, respectively.

All of the separate friction linings 8' to 8''''' are connected through positive locking to the associated separate friction disks 7' to 7''''' and are in frictional contact with the axial abutment surface 10 of the housing 1.

The positive locking is realized via contact surfaces 17' to 17''''' of the separate friction disks 7' to 7''''' and via contact surfaces 18' to 18''''' of the separate friction linings 8' to 8'''''. The contact surfaces 17' to 17''''' and 18' to 18''''' are arranged in the entire peripheral region of the separate friction disks 7' to 7''''' and the separate friction linings 8' to 8''''', whereby the forces to be transferred are minimized.

Because the contact surfaces 17' to 17''''' and 18' to 18''''' have a rotationally symmetric shape, they are equally suitable for force transmission in both rotational directions.

Figure 5:
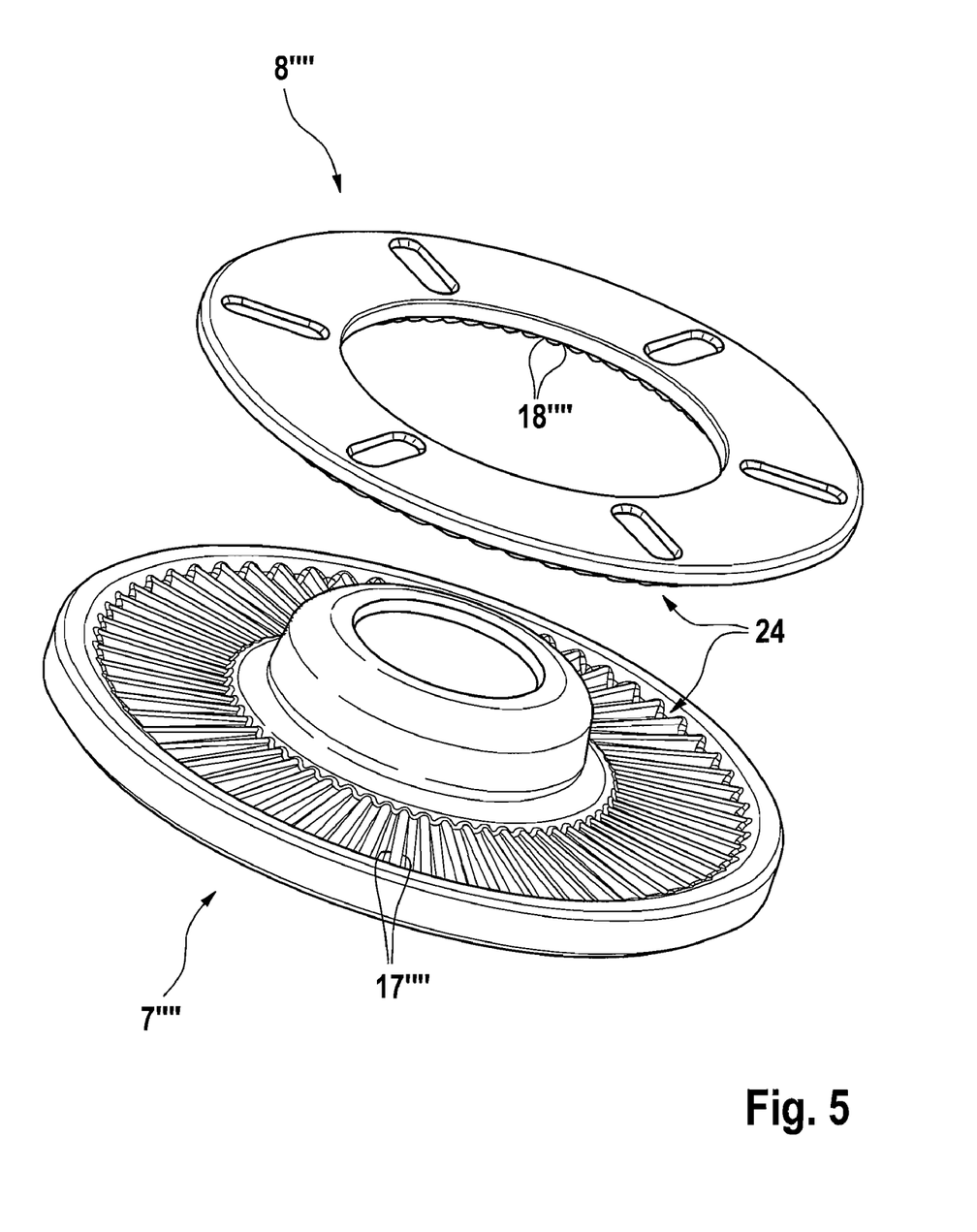
FIG. 5 a perspective view of a separate friction disk and the mating separate friction lining with spur gearing.

Because the mating contact surfaces 17' to 17''''' and 18' to 18''''' of the separate friction disks 7' to 7''''' and separate friction linings 8' to 8''''' overlap, a press fit with play-free positive locking is guaranteed between these components, with the exception of the solution of FIG. 5.

Figure 2:
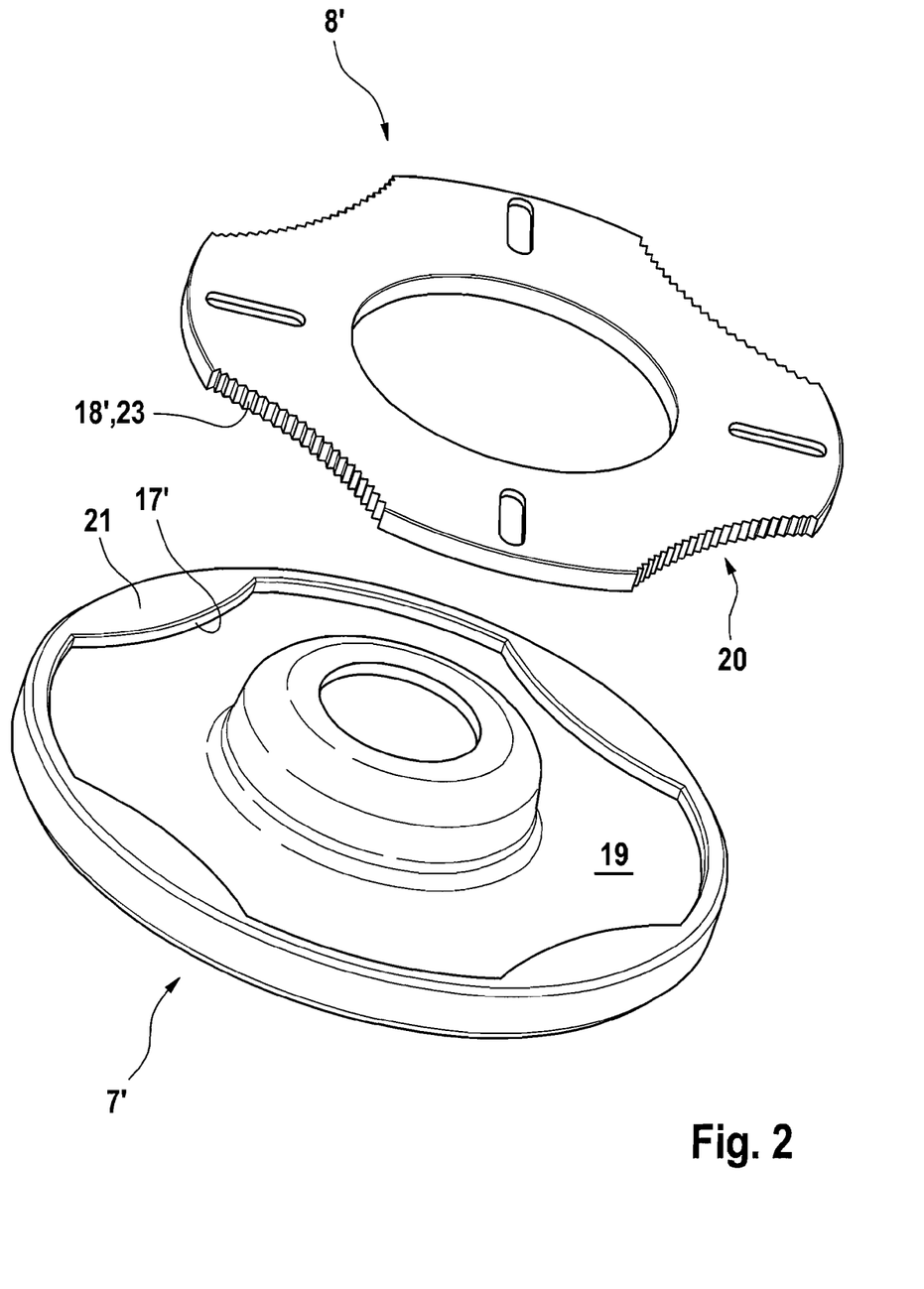
FIG. 2 a perspective view of a separate friction disk and a mating separate friction lining with semi-elliptical contact surfaces.

In FIG. 2, the separate friction disk 7' is shown. This has a countersunk region 19 with a circular basic shape for receiving the separate friction lining 8'. The separate friction lining 8' has four semi-elliptical recesses 20 distributed uniformly on its periphery with the contact surfaces 18', which engage with the four contact surfaces 17' of the separate friction disk 7'.

Figure 3:
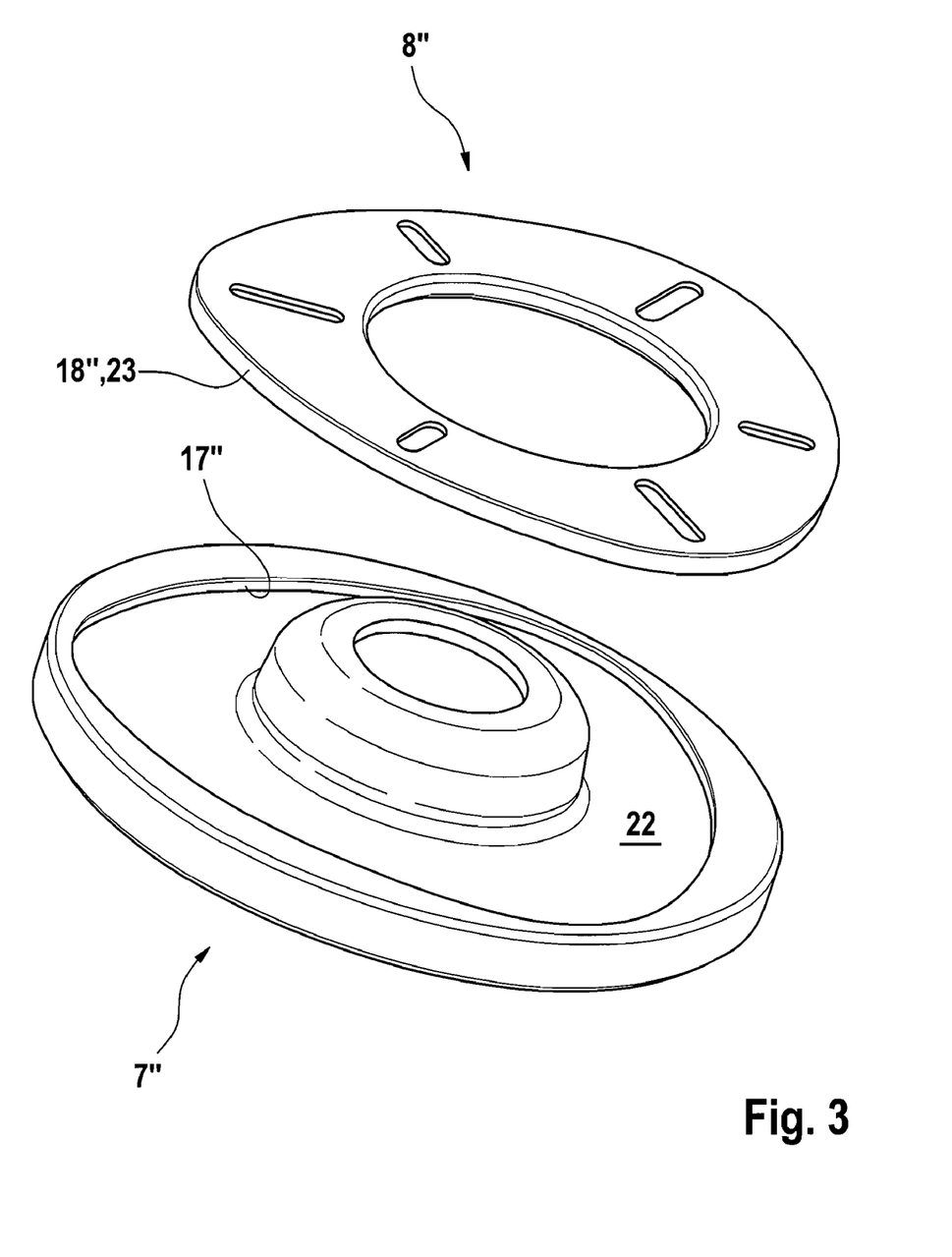
FIG. 3 a perspective view of a separate friction disk and a mating separate friction lining with a polygonal contact surface.

The contact surface 17" shown in FIG. 3 for a flat countersunk region 22 of the separate friction disk 7" and the contact surface 18" of the mating separate friction lining 8" have a polygonal shape. This is also suitable for transmitting the friction moment in both rotational directions of the separate friction disk 7".

The semi-elliptical contact surfaces 18' of the separate friction lining 8' of FIG. 2 and the polygonal contact surfaces 18" of the separate friction lining 8" of FIG. 3 have mini teeth 23 formed integrally with the contact surfaces 18', 18" and arranged radially on these surfaces for achieving an overlap. These parts deform when the separate friction linings 8', 8" are pressed into the countersunk regions 19, 20 of the separate friction disks 7", 7'" and fix the separate friction linings 8', 8" there without play.

Figure 4:
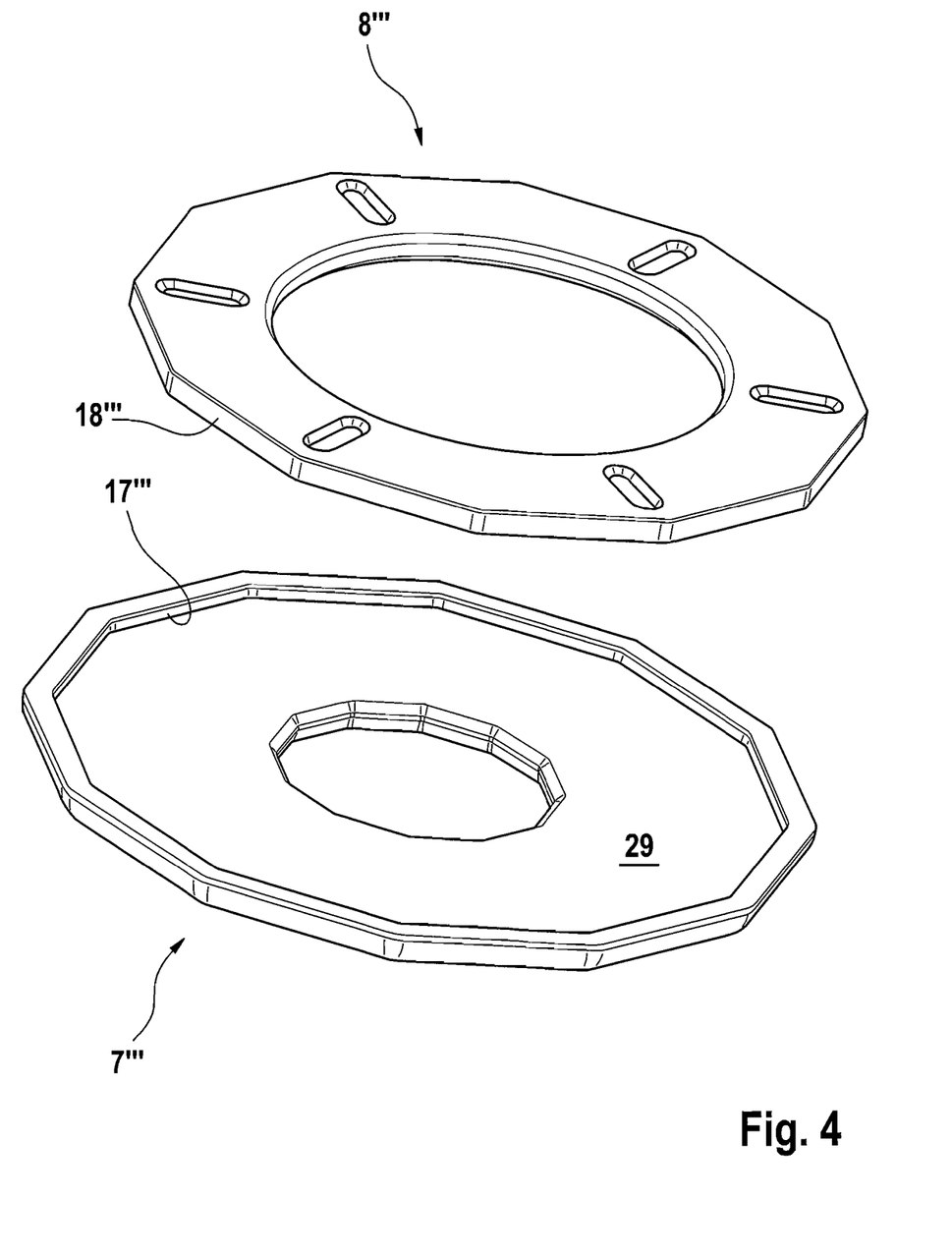
FIG. 4 a perspective view of a separate friction disk and a mating separate friction lining with a dodecagonal contact surface.

FIG. 4 shows the separate friction disk 7'" with the contact surface 17'" of a flat countersunk region 31 and the mating separate friction lining 8'", which has a dodecagonal shape.

The thickness of the separate friction linings 8', 8", 8'" is selected so that these project past the countersunk regions 19, 22, 31 by the level of wear.

In FIG. 5, the separate friction disks 7'''' and the separate friction lining 8'''' are shown, which have identical spur gearing 24. Their tooth flanks are used as contact surfaces 17'''', 18''''. Due to the spur gear geometry, the separate friction lining 8'''' centers itself. Here, the friction moment is also transferred without play in both rotational directions.

Figure 6:
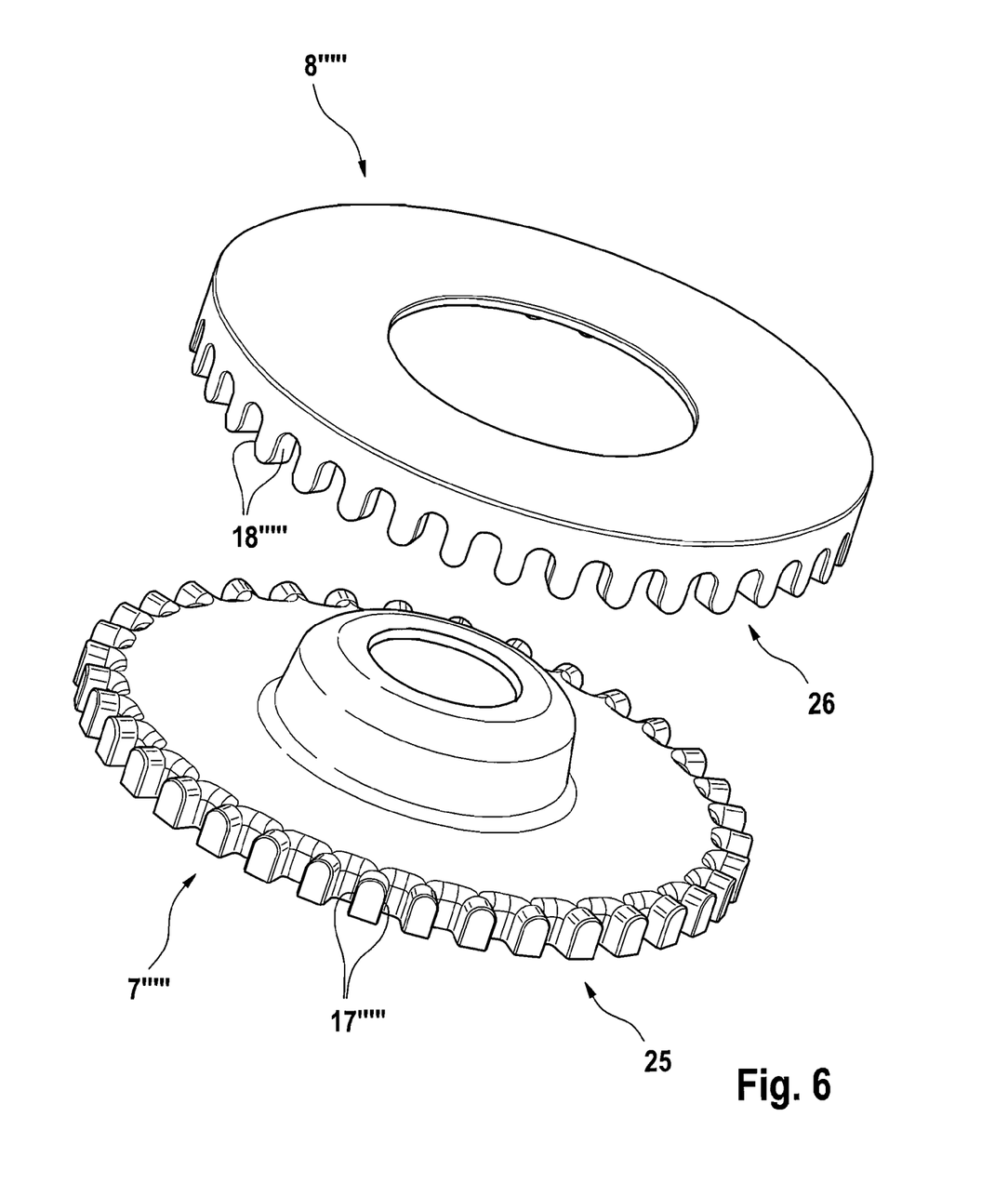
FIG. 6 a perspective view of a separate friction disk and the mating separate friction lining with axial teeth on the periphery.

In FIG. 6, the separate friction disk 7''''' and the separate friction lining 8''''' are shown, on whose periphery axial gearing 25, 26 is arranged, respectively.

Figure 7:
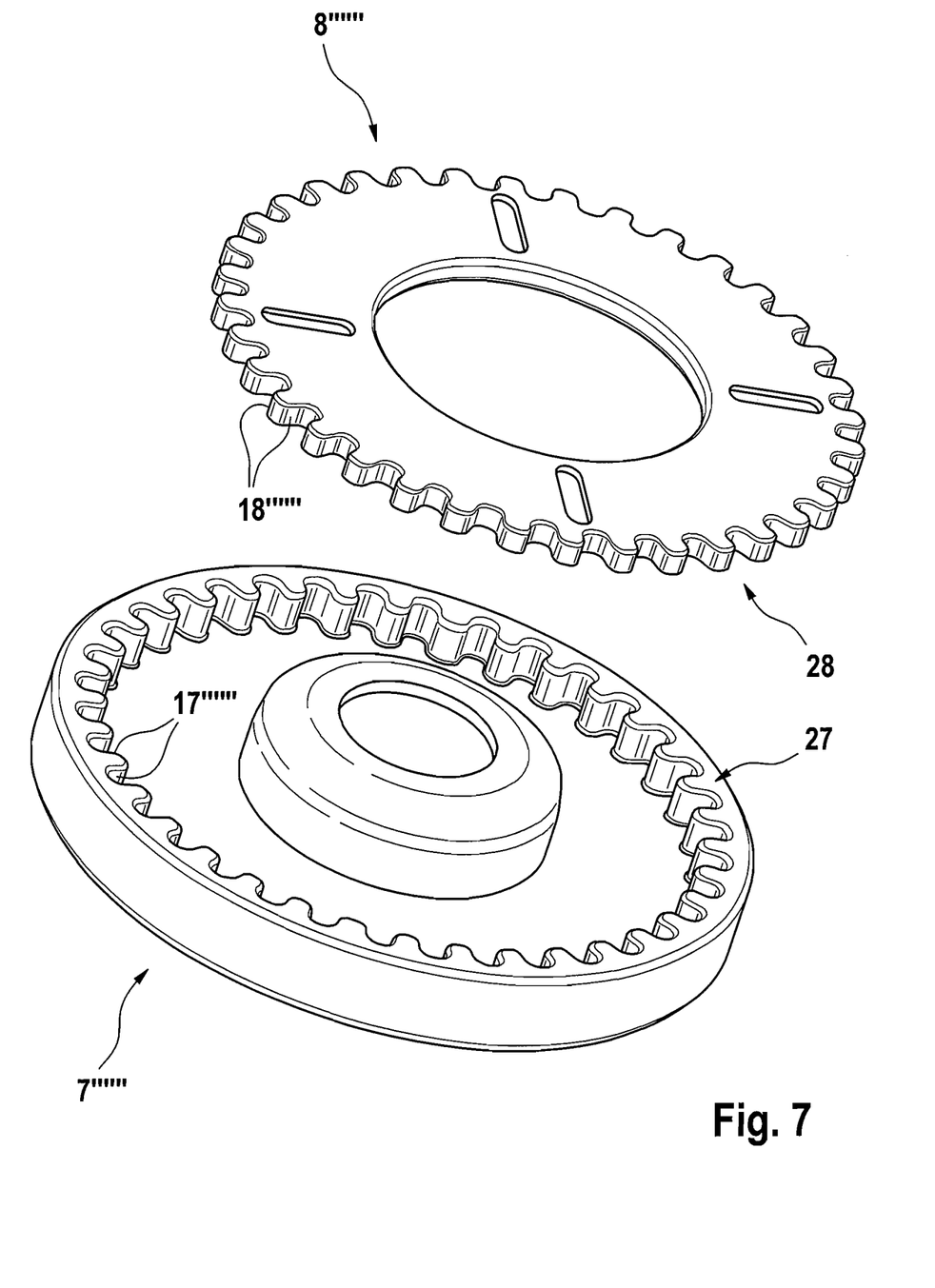
FIG. 7 a perspective view of a separate friction disk and the mating separate friction lining with radial teeth on the periphery.

FIG. 7 shows the separate friction disk 7'''''' and the separate friction lining 8'''''' accordingly, on whose periphery radial gearing 27, 28 is provided, respectively. The gearing 25, 26 and 27, 28 are embodied as tooth couplings, whose tooth flanks are used as contact surfaces 17''''', 18''''' and 17'''''', 18''''''.

In addition to the discussed examples, all conceivable rotationally symmetric contact surfaces of separate friction disks and mating separate friction linings fall under the claims for protection.

REFERENCE SYMBOLS

1 Housing
2 Clamping arm
3 Tension roller
4 Hub
5 Shaft
6 Sliding bearing
7 Friction disk
7' to 7'''' Separate friction disk
8 Friction lining
8' to 8'''' Separate friction lining
9 Helical spring
10 Abutment surface
11 Plastic part
12 Outer ring
13 Roller bearing
14 Collar
15 Screw
16 Protective cap
17' to 17'''' Contact surfaces of separate friction disk
18' to 18'''' Contact surfaces of separate friction lining
19 Countersunk region
20 Recess
21 Raised section
22 Countersunk region
23 Mini fixing teeth
24 Spur gearing
25 Radial external gearing
26 Axial gearing
27 Radial internal gearing
28 Radial external gearing
29 Countersunk region

The invention claimed is:

1. Clamping device with mechanical damping for a traction mechanism drive, comprising a clamping arm, which carries a tension roller on one end, which is rotatably mounted to a housing via a shaft connected in a rotationally fixed manner on its other end, and which is elastically supported on the housing by a torsion and compression spring, a free end of the shaft is connected in a rotationally fixed manner to a friction disk, and a friction lining is arranged between the friction disk and an axial abutment surface of the housing, the friction disk is connected to the friction lining, which is a separate part, in a positively locking manner without play and the friction lining is frictionally engaged with the axial abutment surface of the housing.

2. Clamping device according to claim 1, wherein the positive locking is realized via mating contact surfaces of the friction disk and the friction lining, wherein the contact surfaces are arranged around an entire peripheral area of the friction disk and the friction lining.

3. Clamping device according to claim 2, wherein the mating contact surfaces of the friction disk and the friction lining overlap, which leads to a play-free positive locking through pressing together.

4. Clamping device according to claim 3, wherein the contact surfaces have a rotationally symmetric construction.

5. Clamping device according to claim 4, wherein the friction disk has a flat countersunk region with a circular basic shape for the friction lining, which has four semi-elliptical recesses distributed uniformly about a periphery thereof with the contact surfaces, which engage with the contact surfaces of corresponding raised sections of the friction disk.

6. Clamping device according to claim 5, wherein deformable mini fixing teeth are provided, which are connected integrally to the contact surfaces and are arranged radially.

7. Clamping device according to claim 4, wherein the contact surface, which defines a flat countersunk region of the friction disk and the contact surface of the mating separate friction lining have a polygonal shape.

8. Clamping device according to claim 4, wherein the contact surface of a flat countersunk region of the friction disk and the contact surface of the mating separate friction lining have a dodecagonal shape.

9. Clamping device according to claim 4, wherein the friction disk and the friction lining have identical spur gearing, with tooth flanks that are used as the contact surfaces.

10. Clamping device according to claim 4, wherein axial gearing is arranged on a periphery of the friction disk and the friction lining, respectively, or radial gearing is arranged on the periphery of the friction disk and the friction lining, respectively, wherein the gearing comprises tooth couplings and tooth flanks of the gearing are used as contact surfaces.

* * * * *